United States Patent
Gotz

[11] 3,745,724
[45] July 17, 1973

[54] WATER INTERCEPTING CONNECTION BETWEEN THE REAR WINDOW AND ROOF OF A MOTOR VEHICLE

[75] Inventor: Hans Gotz, Sindelfingen, Germany

[73] Assignee: Daimler-Benz Aktiengesellschaft, Unterturkeim, Germany

[22] Filed: May 7, 1971

[21] Appl. No.: 141,195

[52] U.S. Cl. .................................. 52/11, 52/403
[51] Int. Cl. ............................................ B60j 1/18
[58] Field of Search ............... 52/11, 13, 97, 397, 52/403, 502; 296/93, 137 R, 84 R; 49/476

[56] References Cited
UNITED STATES PATENTS
3,118,701 1/1964 Pesas ............................... 296/93
3,478,476 11/1969 Kemp ............................... 52/397 X
3,019,049 1/1962 Barenyi ........................... 296/137 R
3,474,586 10/1969 Hoverman ....................... 52/403 X Primary Examiner—Frank L. Abbott
Assistant Examiner—Carl D. Friedman
Attorney—Waters, Roditi, Schwartz & Nissen

[57] ABSTRACT

The upper edge of the rear window of a motor vehicle is connected to the roof of the vehicle by a connection which provides a lateral water channel having an open top to intercept the flow of water from the roof towards the rear window. The channel may be defined between the roof and a rubber undermolding and decorative outermolding, or the channel may be formed entirely within the outermolding when the window is directly joined to the roof by adhesives.

5 Claims, 2 Drawing Figures

PATENTED JUL 17 1973 3,745,724

WATER INTERCEPTING CONNECTION BETWEEN THE REAR WINDOW AND ROOF OF A MOTOR VEHICLE

BRIEF SUMMARY OF THE INVENTION

The invention relates to a rear window assembly of a motor vehicle. In such assembly, the window pane is attached to the vehicle body by means of a rubber undermolding and the undermolding is covered by a decorative outermolding, or alternatively the window pane is adhesively joined to the vehicle body and the window pane edge is covered by a decorative molding.

The view through the rear window of the motor vehicle can become considerably impaired when spray from preceding cars is spattered on the front windshield during travel on wet roads and this is mixed with water thereon and is driven rearwardly, by the airstream produced by the vehicle movement, over the roof of the car, where it flows over the rear window to deposit the particles of dirt thereon.

It is an object of the present invention to provide a rear window assembly of a motor vehicle which avoids the above drawback.

According to the invention, this objective is achieved by providing a drainage channel along the upper edge of the rear window, which is defined either by the decorative outer molding itself, or by the molding in combination with the vehicle body and the rubber undermolding.

The water with dirt particles, which is blown over the vehicle roof, is collected by the structurally simple and inexpensive arrangement of the water drainage channel, and diverted to flow laterally of the rear window, so that the water does not reach the rear window on which the dirt particles could deposit and dry. A clear view through the rear window is also ensured during very heavy rainstorms.

In the case when the rear window is an immediate continuation of the vehicle roof and the upper edge of the rear window adjoins the edge of the roof of the body, the above arrangement can be provided to advantage in such a manner that the projecting portion of the drainage channel, as seen in cross-section, does not project beyond the contour of the vehicle roof in order to avoid creation of wind noises.

DETAILED DESCRIPTION

Figure 1:
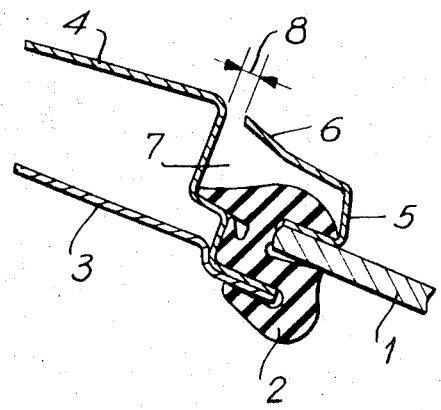
FIG. 1 is a sectional view showing the connection between the upper edge of the rear window of a motor vehicle and the roof according to a first embodiment of my invention.

In the embodiment illustrated in FIG. 1, the pane 1 of a rear window is attached to the car body 3 by means of a rubber undermolding 2, and the illustrated upper edge of the rear window immediately adjoins the roof 4 of the car body. An outer decorative molding 5 serves the purpose of covering the pane attachment assembly, and is secured in a slot in the rubber undermolding 2. A projecting portion 6 of the upper decorative molding 5, in combination with the rubber undermolding 2 and the vehicle body, define a lateral water drainage channel 7. A gap 8 is formed between portion 6 and roof 4 at the top of the water drainage channel 7 such that any water running down the vehicle roof 4 cannot pass over the gap onto the window pane 1. In order to avoid creation of wind noises, the projecting portion 6 does not project beyond the contour of the vehicle roof.

Figure 2:
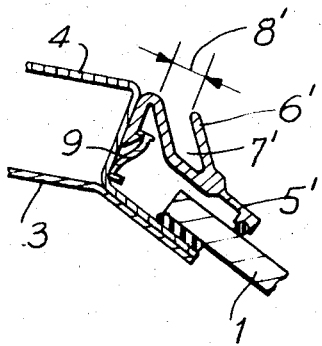
FIG. 2 is a similar view of a second embodiment thereof.

In the embodiment illustrated in FIG. 2, the pane 1 of the rear window is directly attached to the vehicle body by means of an adhesive. The connection is covered by a decorative molding 5', which is secured by a holding means 9 attached to the vehicle body. The decorative molding 5' is shaped in such a manner as to provide a water drainage channel 7' in its portion immediately adjoining the vehicle roof 4. The gap 8' at the top of the water drainage channel 7' is relatively wide. A projecting portion 6' of the decorative molding 5' does not project beyond the contour of the vehicle roof.

From the above it is seen that the invention provides a lateral water drainage channel at the connection between the roof of the vehicle and the rear window and this channel is open at its top to intercept water flowing on the roof towards the window and to constrain the water to flow in the channel.

Numerous variations and modifications of the disclosed embodiments will now become apparent to those skilled in the art without departing from the scope and spirit of the invention as defined in the appended claims.

What is claimed is:

1. Apparatus for preventing flow of water from the roof of a vehicle onto the rear window of the vehicle, said apparatus comprising an adhesive connection between the roof of the vehicle and the lower surface of the rear window, a holding member secured to the roof in the region where the rear window is secured to the roof and an outer molding engaged by said holding member and extending to the upper surface of the rear window to cover the adhesive connection from above, said outer molding being provided with a channel extending laterally of the window, said channel being wholly accommodated within the outer molding independently of the roof and window and having an open top proximate the roof to intercept water flowing on the roof towards the window and to constrain the water to flow in the channel.

2. Apparatus as claimed in claim 1 wherein the outer molding includes an upwardly projecting portion which is spaced from an opposite face of the outer molding to define side surfaces for the channel, the bottom of the channel being formed by the portion of the outer molding extending between the side surfaces.

3. Apparatus as claimed in claim 1 wherein said outer molding is confined within the contour of the roof.

4. Apparatus as claimed in claim 1 wherein said outer molding extends upwardly from said holding member to conceal said holding member therebeneath.

5. Apparatus as claimed in claim 1 wherein said holding member is secured to the roof to form a slot therewith into which a portion of the outer molding is engaged to lie flush against the roof.

* * * * *